May 12, 1964          H. B. IRWIN          3,132,417
PRODUCTION OF PLASTIC FOAM ARTICLES
Filed Oct. 18, 1961
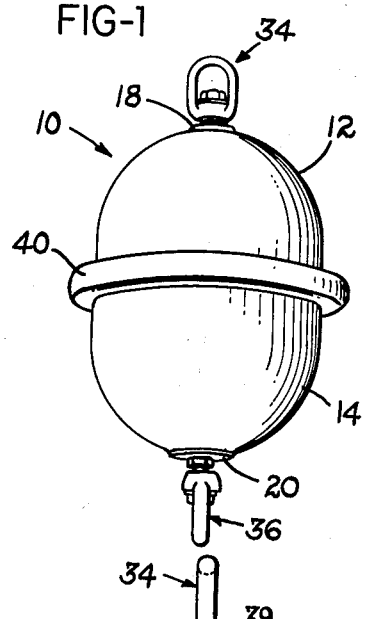
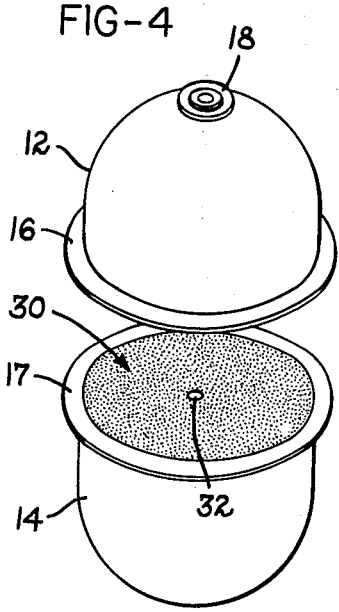
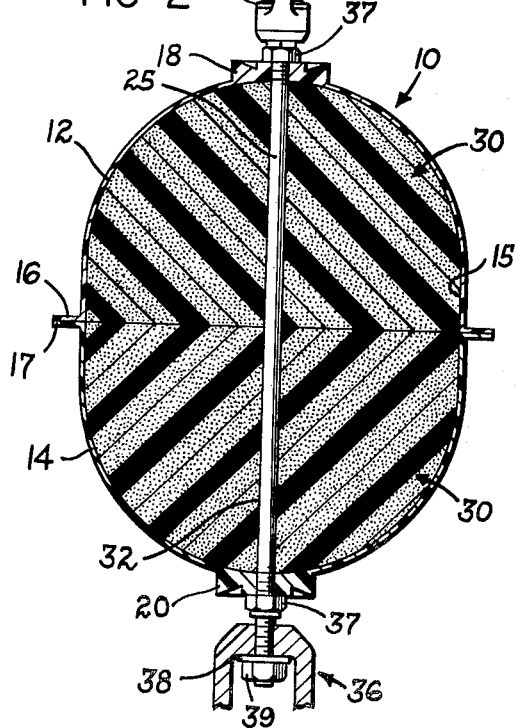
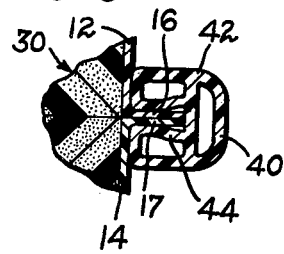
INVENTOR.
HARRY BASIL IRWIN
BY
Marechal, Biebel, French & Bugg
ATTORNEYS

United States Patent Office 3,132,417
Patented May 12, 1964

3,132,417
PRODUCTION OF PLASTIC FOAM ARTICLES
Harry Basil Irwin, Dayton, Ohio, assignor to Dayton Formold Inc., Dayton, Ohio, a corporation of Ohio
Filed Oct. 18, 1961, Ser. No. 145,841
4 Claims. (Cl. 29—433)

This invention relates to the production of buoyant articles from molded plastic foam material and, more particularly, molded articles of rigid plastic foam having on the surface thereof an outer layer or covering or skin of a material different from the rigid plastic foam.

The utility and advantages of plastic foams have now been demonstrated with many articles, particularly with regard to buoyancy and low density, water insolubility, substantially completely enclosed cellular structure, and ease of molding or causing the foam to expand within a mold. Plastic foam, to which this invention relates, may conveniently be exemplified by polyurethane foams formed by the reaction between a polyisocyanate and a polyol of the polyester or polyether type. In the case of a polyurethane foam, the foam is quite rigid and does not exhibit a tendency to absorb water, as may be the case with expanded flexible foams such as polystyrene. Such foams of the polystyrene type or flexible polyurethane behave to some extent like a sponge, that is, if such foams are compressed and immersed in water, they will absorb water on expansion. In the case of rigid foams such as polyurethane, the foams do not absorb water and cannot be compressed without destroying their cellular nature. In certain applications, however, where the low density and buoyancy and cellular structure and heat insulation of such expanded plastic foam materials may be advantageous, other characteristics of expanded foam articles may indicate the inapplicability of this material for such materials. For example, the foam may be soluble in petroleum hydrocarbons, so that some difficulty or undesirably short life may be experienced if it is attempted to utilize expanded polystyrene foam articles, even with the hard outer skin or layer, as floats in liquid tanks containing petroleum hydrocarbons and/or as floating buoys in waterways where there is present an excessive amount of contamination from gasoline or oil. Similarly, if it is desired that the outer surface of the foam article possess certain specialized surface characteristics (such as, for example, certain fluorescent coloring for marker buoys or the inclusion of metallic components as for enhancing radar pickup), it may be found that such specialized surface characteristics are more readily applied to an article having a surface layer or skin different from that achievable with plastic foam.

According to this invention, however, molded plastic foam articles are provided having an outer layer or skin completely enclosing the article, and of a material different from the rigid plastic foam, with the resulting article being a unitary device having the rigid plastic foam completely filling the outer skin and/or integrally bonded therewith, as may be desired, and with the ready molding and forming of the finished article regardless of the particular final shape desired and/or regardless of whether both the outer skin and the internal plastic foam are produced in a single unitary operation or whether the plastic foam is molded into a preformed outer surface.

One object of this invention is to provide relatively rigid molded plastic foam buoyant articles of the character described comprising expanded cellular substantially rigid plastic foam and having over the outer surface thereof a skin or layer of material different from the plastic of the plastic foam and possessing particular surface or other characteristics not possessed by the plastic foam material.

Another object of this invention is to provide relatively rigid expanded plastic foam buoyant articles of the character described and having an outer surface layer comprising a material which is not susceptible to molding in the form of expanded cellular and substantially rigid plastic foam, and having the interior of such articles formed of expanded plastic foam having mechanical and chemical characteristics different from those of the outer surface of the article.

A further object of this invention is to provide a relatively rigid low density buoyant article capable of remaining afloat in the event of a puncture thereof comprising expanded rigid plastic foam and an outer layer enclosing said plastic foam and comprising a heat formed plastic skin of a material different from the plastic material of the expanded foam interior.

Still another object of this invention is to provide a method for the formation of expanded plastic foam articles of the character described wherein expanded plastic foam is molded within an outer skin of a material different from the plastic of the interior plastic foam.

A still further object of this invention is to provide a method for the production of molded plastic foam articles of the character described in which rigid polyurethane foam is molded within a preformed outer skin of a different plastic material having different mechanical and chemical characteristics to form the article.

Other objects and advantages of this invention will be apparent from the following description, the accompanying drawing and the appended claims.

In the drawing—

FIG. 1 is a view in perspective of a completed buoyant article constructed in accordance with the present invention;

FIG. 2 is a view partly in section and partly in elevation of the article shown in FIG. 1;

FIG. 3 is a fragmentary view on an enlarged scale of the peripheral seal utilized in the article of FIG. 1; and FIG. 4 is a view in perspective of the body of the buoyant article during the method of fabrication thereof in accordance with the present invention.

Referring to the drawing, which illustrates preferred embodiments of the present invention, a buoyant article 10 is shown in FIGS. 1 and 2 including a pair of plastic members or shells 12 and 14 defining a hollow interior 15. Each of the plastic members 12 and 14 is provided with a peripheral flange 16 and 17, respectively, which are employed to secure the two shells together as will be described more fully hereinbelow. At the apex of each of the shells 12 and 14 is formed a raised section 18 and 20, respectively, which is apertured and threaded to receive the connecting rod 25.

The hollow interior 15 between shells 12 and 14 is substantially completely filled with a rigid polyurethane foam 30 which differs from compressible polyurethane foams or other flexible foams known in the art in that it will not absorb water. A central passageway 32 is provided through the interior foam portion 30 to receive the rigid metallic rod 25, the rod 25 being threaded at the ends thereof so as to secure the shells 12 and 14 together and allow mounting of shackle elements 34 and 36. Between the shackle elements 34 and 36 and the shells 12 and 14 there is provided a nut 37 which is screwed down tightly to the raised portion of the shell in order to maintain the peripheral flanges 16 and 17 in intimate contact. The nuts 37 may be of the self-locking type so as to prevent them from working loose during use of the article. The shackles 34 and 36 are maintained in a rotatable movable relationship with respect to the center rod 25 by a washer 38 and nut arrangement 39, the nut being fixed to the rod 25 by brazing or peening it so as to prevent it from rotating free of the rod.

It is desired to employ a peripheral flange since such an arrangement may be utilized as a bumper, and adds to the strength of the buoyant article. The peripheral flanges 16 and 17 may be secured together as by stapling or heat sealing, or if desired, need not be affixed together since the center rod provides sufficient strength to hold the shells 14 and 15 together.

Referring to FIG. 3, a flexible plastic bumper element 40 of vinyl, or the like, completely surrounds the peripheral flanges 16 and 17 and operates, to some extent, to prevent introduction of liquid into the interior foam section 30 through the joints between the flanges 16 and 17. The bumper element includes a pair of resilient lips 42 and 44 which engage the flanges 16 and 17 and operate as a seal as above described. Introduction of liquid through the joint between the shells and the center rod is substantially eliminated by having the rod 25 threadably engaged by the raised sections 18 and 20 of the shells.

In forming the article above described, a pair of shells are formed which may be of identical geometrical configuration, if a symmetrical article is being formed, or may be of different geometric configurations such as oval and wedge-shaped as well as bell-shaped. Regardless of the shape of the article, it is preferred that matching peripheral flanges be formed thereon either during formation of the shell or subsequent thereto as will be described more fully hereinbelow.

The material employed in forming the shells is a linear high density polyethylene available commercially under the trademark Marlex, although it is understood that any other plastic material may be employed for the shells or outer skin provided it possesses the desired stability in petroleum hydrocarbons and is capable of being heat molded, cast or injection molded to the desired configuration. Hydrocarbon stability is desirable since harbors, marinas and other like areas inevitably have fuel oil or gasoline floating on the surface of the water which may have serious effects on buoys and the like fabricated of hydrocarbon soluble plastic materials.

The shells are preferably formed by an injection molding or vacuum forming technique and the peripheral flanges are formed integrally therewith during formation of the shell. Additionally, it is preferred that the raised portion, for example, that shown at 18 or 20, be formed at the apex of each shell element during formation thereat, a procedure which may be carried out conveniently if injection or vacuum molding techniques are employed.

Subsequent to the formation of the shells, a liquid mixture capable of expanding into a rigid cellular or porous foam is introduced into the hollow portion of each shell. It is preferred that the liquid mixture be introduced at this point in the assembly so as to allow unobstructed expansion of the foam and prevent entrapment of large air bubbles in the cellular foam during its formation. Expansion of the liquid mixture which is introduced into the shells may be accomplished by stirring the reactants to effect release of a gas which brings about the cellular structure.

It is preferred that a polyurethane composition be employed such as that sold commercially under the trademark Vultrafoam, and believed to be a polyisocyanate and polyol composition utilizing a Freon blowing agent with a catalyst to accelerate the reaction. During the expansion or foaming action of the urethane, the inside wall of the shells is etched slightly and there results a slight bond between the rigid foam and the interior wall of the shell. Hardening of the foam may be effected by heating the shell with the reaction mixture therein, although it is possible to effect hardening by allowing the expansion mixture to remain at ambient temperatures for about 15 to 30 minutes. In cases where heat is utilized to set or cure the foam, it is preferred that the temperature employed be below that at which distortion of the outer shell takes place.

After the foam has become cured or hardened, the excess thereof is trimmed away to provide a pair of foam filled shells as shown for example in FIG. 4 wherein like reference numerals have been applied. An aperture is then provided in each shell by a drilling operation, or the like, and the threads are tapped into the raised sections 18 and 20 at the apex of each shell by a threading tool, as is well known in the art resulting in a pair of shells having communicating passageways therein. The rigid rod 25, having threaded ends, is inserted into one of the foam filled shells while the free end of the rod is inserted into a second shell such that the flanges of the shells, if flanges have been provided thereon, are facing each other. In any event, the shells are assembled such that the exposed foamed portions are facing each other as indicated generally in FIG. 4. The shells are then threaded over the rod by rotating one in a counterclockwise direction and the other in a clockwise direction until the flanges abut each other. Lock nuts 37 and 38 are then screwed over the rod 25 and the remaining portion of the shackle assembly is attached as previously described. The flanges may be secured together by stapling, riveting or heat sealing them or they may remain unattached, although it is preferred that the flanges be affixed by stapling, which is a relatively simple operation, in order to prevent rotation of the shells.

If the shells as initially formed do not include flange elements thereon, a peripheral flange may be assembled to the shells prior to the foaming operation, or subsequent to the foaming operation, or subsequent to assembly of the shells over the rod, by heat sealing a flange thereto or utilizing an adhesive to secure the flanges in place. As was stated previously, it is desired that flanges be present in order to increase the strength of the article by providing an extra thickness of relatively rigid noncellular material about the outer periphery of the article, since it is that portion of the article which is most susceptible to crushing and the like during use thereof.

Once the shackle units have been assembled on the center rod, the plastic bumper may be assembled over the flanges by utilizing a length of vinyl bumper corresponding to the peripheral distance of the article in the area of the flanges. It is preferred that a low Durometer vinyl material be employed which is placed over the flanges such that the lips thereof engage the flanges, and the bumper is secured in place by heat sealing the free ends in order to provide a continuous bumper as shown in FIG. 1 for example. If desired, assembly of the bumper over the flanges may be carried out prior to the final assembly of the shackle units to the center rod.

The outer shell of non-cellular plastic material may be color coded or rendered radar reflecting for use as marker buoys by incorporation of a suitable dye or radar reflecting material to the raw material prior to formation of the shells. It is preferred that the dye color be physically incorporated into the starting material as opposed to painting or coating since most paint compositions tend to peel or flake off polyethylene type materials as the article is subjected to the rigorous bumping and crushing which buoys encounter. Similarly, the vinyl bumper may be colored or marked appropriately in accordance with established color designations by incorporation of suitable dyes and the like into the starting material.

One important aspect of the present invention is the rigidity of the resultant buoyant article and its ability to remain afloat even though punctured or crushed. For example if the outer skin of the buoy were punctured, as may occasionally happen when the buoys are used as targets in rifle practice, water will be introduced into the buoy, but will not travel throughout the foam mass. The reason for this is that the foam is rigid and does not include a multiplicity of interconnected passages as may be the case with flexible polyurethane foams or other flexible foams. If the buoy were crushed after puncture thereof, the fact that the foam is rigid tends to prevent absorption of the water by the foam since the foam is not compressible. While crushing may effect shattering or breaking up of the foam within the buoy, the foam will not absorb a sufficient amount of water to cause the buoy to sink.

In contrast to this, a buoy which is filled with a flexible foam will probably remain afloat once it has been punctured. However, subsequent crushing which operates to compress the flexible foam results in absorption of water much in a similar fashion as a synthetic sponge. With the absorption of water by a flexible foam, the buoy rides lower in the water and it is difficult to see, the very thing which is to be avoided if these articles are to be used as channel markers or radar reflecting surfaces, and the like.

Other significant advantages of the article constructed as above described is the fact that the rigid foam improves the structural characteristics of the outer skin of polyurethane plastic by substantially eliminating compression thereof. The use of polyethylene plastic as an outer skin with a rigid cellular material substantially filling the interior thereof, and the use of a peripheral flange provides a buoyant article or float having increased strength and considerable resistance to crushing while exhibiting a remarkable ability to remain afloat although punctured and subsequently crushed as occasionally occurs with channel markers and floats utilized as bumpers in marinas and the like.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. In a process for the production of an expanded rigid buoyant article of the type described, the steps which comprise forming a pair of generally hemispherical shells of plastic material, introducing into each shell a reaction mixture capable of expanding into a rigid cellular foam, effecting expansion and curing of said reaction mixture to provide a relatively rigid foam in the interior of each shell, and assembling said shells together to provide a hollow plastic article having the interior portion thereof substantially filled with a rigid cellular foam.

2. In a process for the production of an expanded rigid buoyant article of the type described, the steps which comprise forming a pair of shells of plastic material each of which is provided with an apex, introducing into each shell a reaction mixture capable of expanding into a rigid cellular foam, effecting expansion and curing of said reaction mixture to provide a relatively rigid porous foam in the interior of each shell, forming an aperture in each shell to provide a pair of shells having a communicating passageway therethrough, inserting a rigid rod into said aperture such that the ends thereof extend beyond the apex of each shell, and securing said shells together to provide a rigid buoyant article of plastic material having the interior thereof substantially filled with a rigid cellular foam.

3. In a process for the production of an expanded rigid buoyant article of the type described, the steps which comprise forming a pair of generally hemispherical shells of plastic material each of which is provided with an apex and peripheral flange, introducing into each shell a reaction mixing capable of expanding into a rigid cellular foam, effecting expansion and curing of said reaction mixture to provide a relatively rigid foam in the interior of each shell, assembling said shells together such that said flanges abut each other to provide a hollow plastic article having the interior portion thereof substantially filled with a rigid cellular foam.

4. In a process for the production of an expanded rigid buoyant article of the type described, the steps which comprise forming a pair of generally hemispherical shells of plastic material each of which includes an apex and a peripheral flange, introducing into each shell a reaction mixture capable of expanding into a rigid cellular foam, effecting expansion and curing of said reaction mixture to provide a relatively rigid foam in the interior of each shell, forming an aperture in each shell to provide a pair of shells having a communicating passageway therethrough, assembling said shells over a metallic rod such that the flanges abut each other and said rod is positioned in said passageway, and securing said shells together to provide a rigid buoyant article having the interior thereof substantially filled with a rigid cellular foam.

References Cited in the file of this patent

UNITED STATES PATENTS

| | | |
|---|---|---|
| 2,411,202 | Gardner | Nov. 19, 1946 |
| 2,814,055 | Phillips | Nov. 26, 1957 |
| 2,911,658 | Stanley | Nov. 10, 1959 |

UNITED STATES PATENT OFFICE
CERTIFICATE OF CORRECTION

Patent No. 3,132,417                                        May 12, 1964

Harry Basil Irwin

It is hereby certified that error appears in the above numbered patent requiring correction and that the said Letters Patent should read as corrected below.

Column 5, line 3, for "effect" read -- affect --; column 6, line 20, for "mixing" read -- mixture --.

Signed and sealed this 27th day of October 1964.

(SEAL)
Attest:

ERNEST W. SWIDER                                      EDWARD J. BRENNER
Attesting Officer                                         Commissioner of Patents